(12) United States Patent
Fitzgerald

(10) Patent No.: US 6,663,187 B2
(45) Date of Patent: Dec. 16, 2003

(54) WHEEL ORNAMENTATION AND ADAPTER

(75) Inventor: Kevin Fitzgerald, Long Beach, CA (US)

(73) Assignee: KMC Products, Inc., Riverside, CA (US)

( * ) Notice: Subject to any disclaimer, the term of this patent is extended or adjusted under 35 U.S.C. 154(b) by 0 days.

(21) Appl. No.: 10/280,132

(22) Filed: Oct. 25, 2002

(65) Prior Publication Data
US 2003/0102712 A1 Jun. 5, 2003

Related U.S. Application Data
(60) Provisional application No. 60/339,410, filed on Oct. 26, 2001.

(51) Int. Cl.[7] .............................. B60B 7/04; B60B 7/00; B60B 1/00
(52) U.S. Cl. .............................. 301/37.25; 301/37.108; 301/35.629
(58) Field of Search .................. 301/37.251, 37.101, 301/37.102, 37.371, 37.26, 37.28, 37.29, 37.106, 37.108, 37.109, 37.38, 37.372, 37.376, 35.631, 35.627, 35.629, 108.1, 108.4, 108.5; 411/204, 209, 313, 314, 533

(56) References Cited

U.S. PATENT DOCUMENTS

| | | | | |
|---|---|---|---|---|
| 1,224,556 A | * | 5/1917 | McConahy | 411/201 |
| 1,378,116 A | * | 5/1921 | Holmes et al. | 411/313 |
| 2,493,366 A | * | 1/1950 | Simcich | 301/108.1 |
| 2,762,469 A | * | 9/1956 | Lyon | 188/264 W |
| 3,219,391 A | * | 11/1965 | Hettinger | 301/37.25 |
| 3,722,958 A | * | 3/1973 | Marshall | 301/37.25 |
| 3,820,851 A | * | 6/1974 | Longo et al. | 301/35.629 |
| 3,869,174 A | * | 3/1975 | Brown et al. | 301/35.629 |
| 5,190,354 A | * | 3/1993 | Levy et al. | 301/37.25 |
| 5,290,094 A | * | 3/1994 | Gragg | 301/37.25 |
| 6,554,370 B2 | * | 4/2003 | Fowlkes | 301/37.25 |

* cited by examiner

*Primary Examiner*—S. Joseph Morano
*Assistant Examiner*—Jason R. Bellinger
(74) *Attorney, Agent, or Firm*—Dykema Gossett PLLC

(57) ABSTRACT

A free wheeling spinner is mounted on a wheel by means of an adapter for accommodating wheels with similar bolt patterns and varying diameters. The spinner is mounted to the adapter by means of a bearing of inner and outer races secured respectively to the adapter and the spinner. Elongated lug nuts having a threaded free end receive bolts for securing the adapter to the automobile wheel.

15 Claims, 5 Drawing Sheets

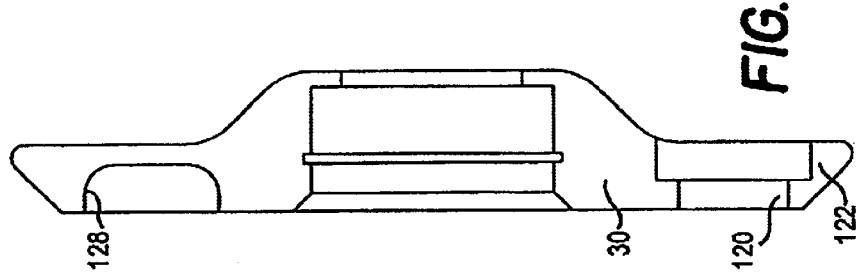
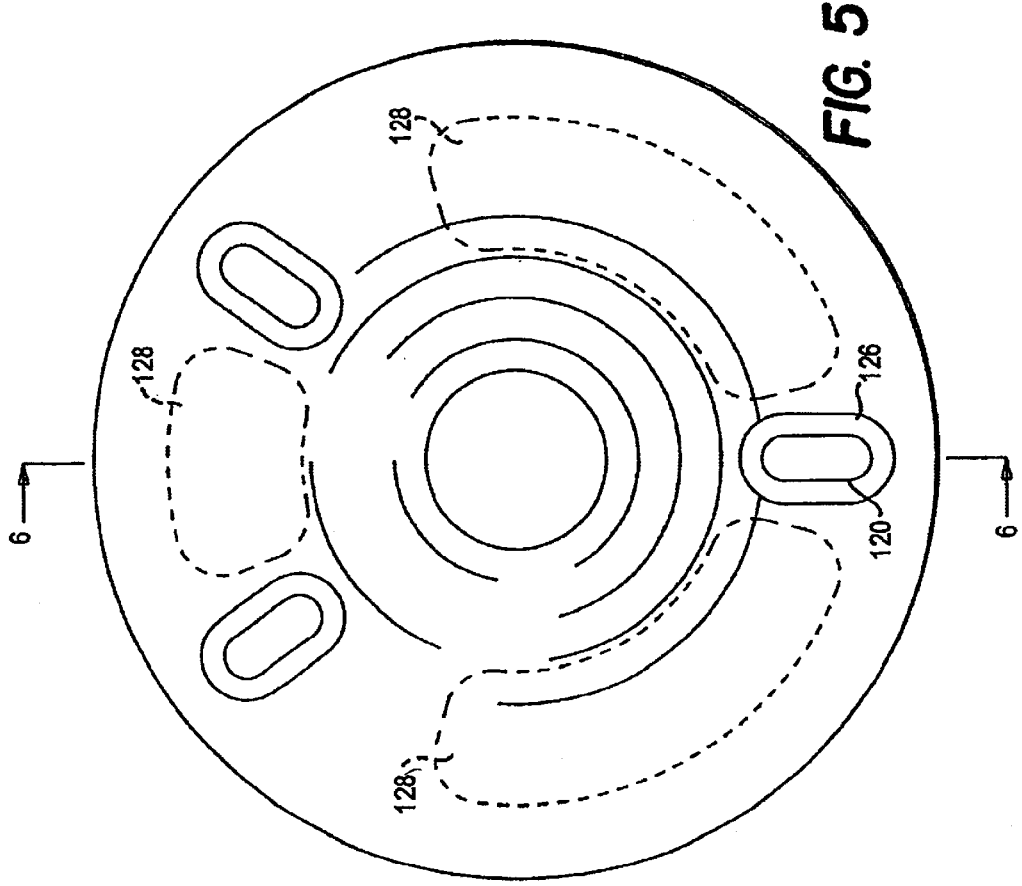

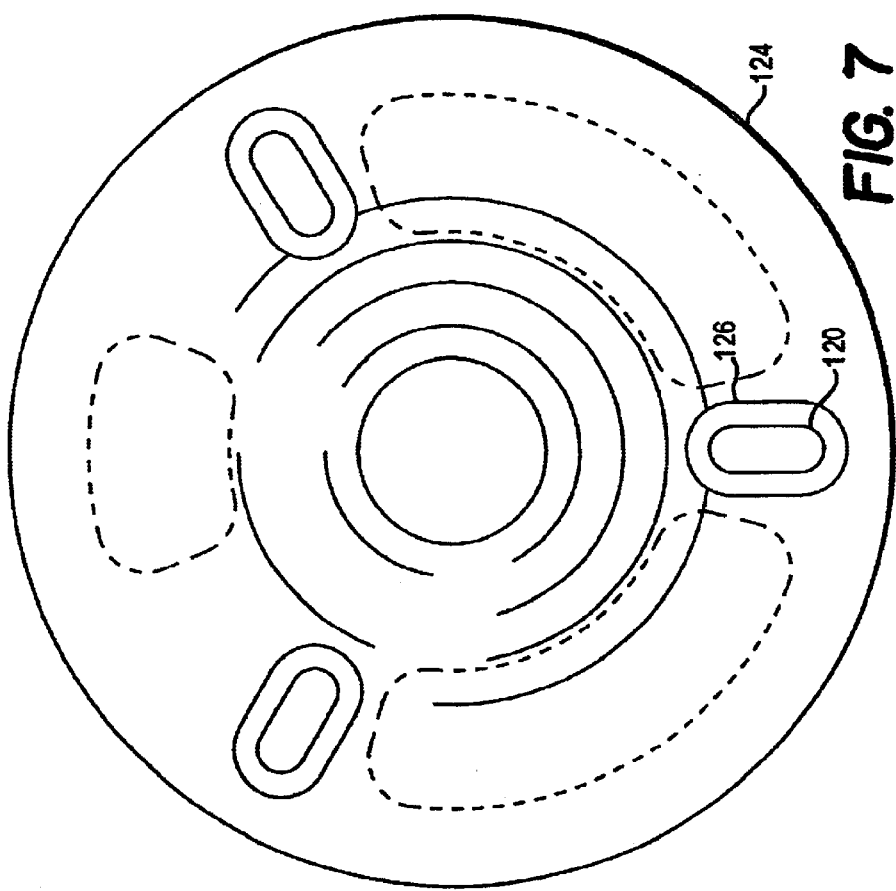
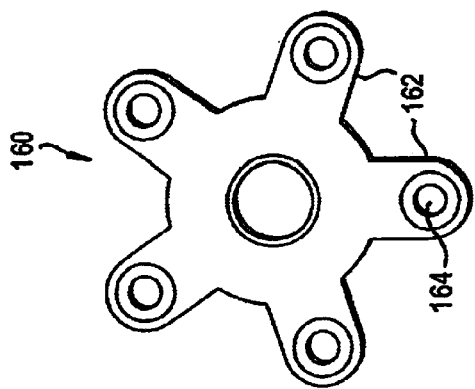

WHEEL ORNAMENTATION AND ADAPTER

CROSS-REFERENCE TO RELATED APPLICATION

This application is related to provisional application serial No. 60/339,410 filed Oct. 26, 2001. The teachings of which are incorporated herein by reference.

FIELD OF INVENTION

The invention pertains to automotive wheel accessories. More particularly, the invention pertains to a wheel ornamentation that is mounted for rotation to the wheel.

The invention includes an adapter and a spinner. The spinner could be any design as long as it conforms to the subject wheel and does not interfere with the ability of the wheel to rotate during normal operation. The adapter is a universal adapter that can be used with any wheel with a corresponding lug nut pattern and supports the spinner to the wheel.

BACKGROUND OF THE INVENTION

The automotive wheel market has evolved into a creative and competitive market. Typically, custom wheels are purchased as after-market accessories from non-automotive manufacturers. These custom wheels vary greatly in design, appearance and type. There are available, as after-market accessories, spinner ornamentations to add to the automobile wheel that enhance the appearance of the wheel. However, in order to use these spinner ornamentations, the consumer also needs to purchase a special wheel different from the OEM (original equipment manufacturer) wheel. There is a desire to customize OEM wheels without the need to purchase completely new wheels.

It is desired to provide a wheel spinner ornamentation that adapts to OEM equipment, regardless of the bolt pattern on the OEM equipment.

It is desired to provide a wheel spinner ornamentation that can be easily installed to after-market custom wheels, regardless of the bolt pattern on the wheels.

It is desired to provide a wheel spinner ornamentation that spins, or remains stationary, irrespective of the rotation of the automotive wheel.

It is desired to provide a wheel spinner ornamentation adapter to install a variety of different spinner ornamentations to be used with OEM or after-market wheels.

SUMMARY OF THE INVENTION

A decorative accessory for attachment to an automobile wheel having a selected bolt pattern includes an adapter having a central aperture and a selected bolt pattern of bolt holes therein matching the corresponding automobile bolt hole pattern. A spinner having a central aperture for coaxial alignment with the aperture in the adapter, is mounted for rotation with respect to the adapter. A bearing having a central aperture, for coaxial alignment between the spinner and the adapter. A fastener engaging the coaxially aligned central apertures secures the spinner, the bearing and the adapter together. Supports the spinner for rotation with respect to the adapter.

BRIEF DESCRIPTION OF THE DRAWINGS

FIG. 5 is a front elevational view of the inventive adapter for a five bolt wheel.

FIG. 6 is a sectional view of the adapter of FIG. 4 taken along line 5—5 of FIG. 4.

FIG. 7 is a front elevation of an alternative adapter for a six bolt wheel.

FIG. 8 is a front elevation of an alternative adapter of the invention.

DETAILED DESCRIPTION OF THE INVENTION

Figure 1:
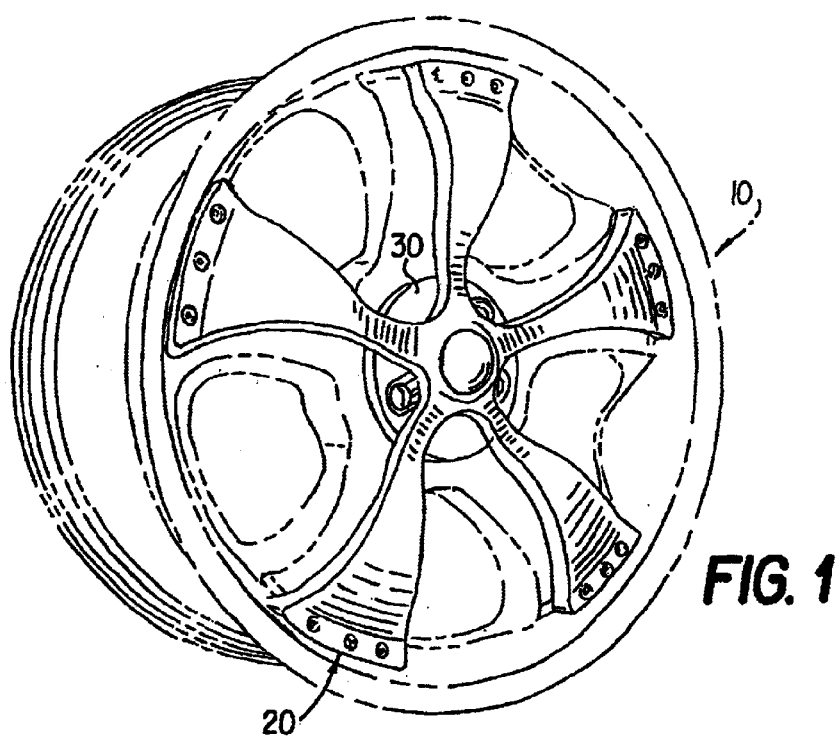
FIG. 1 is a front perspective view of the motor vehicle wheel showing the new ornamental accessory.
Figure 2:
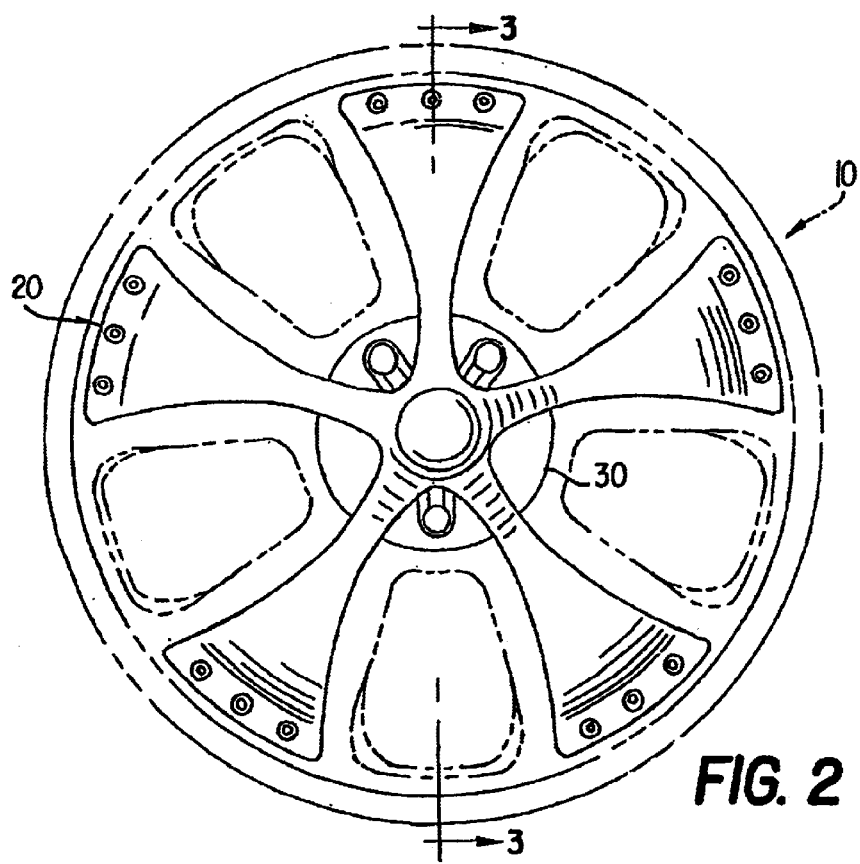
FIG. 2 is a front elevational view of the wheel shown in FIG. 1.
Figure 3:
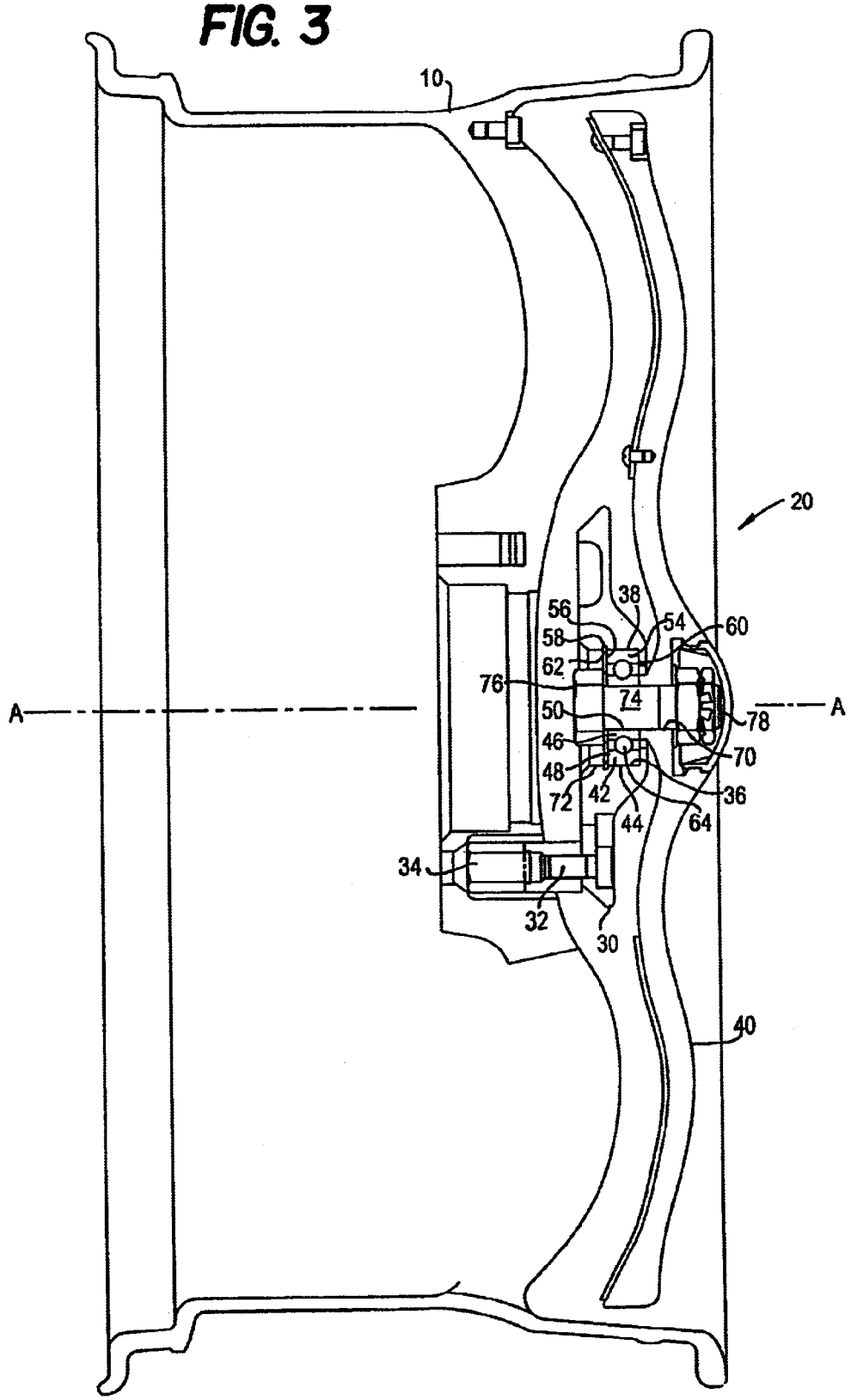
FIG. 3 is a sectional view of the wheel of FIG. 2 seen line 3—3 in FIG. 2.
Figure 4:
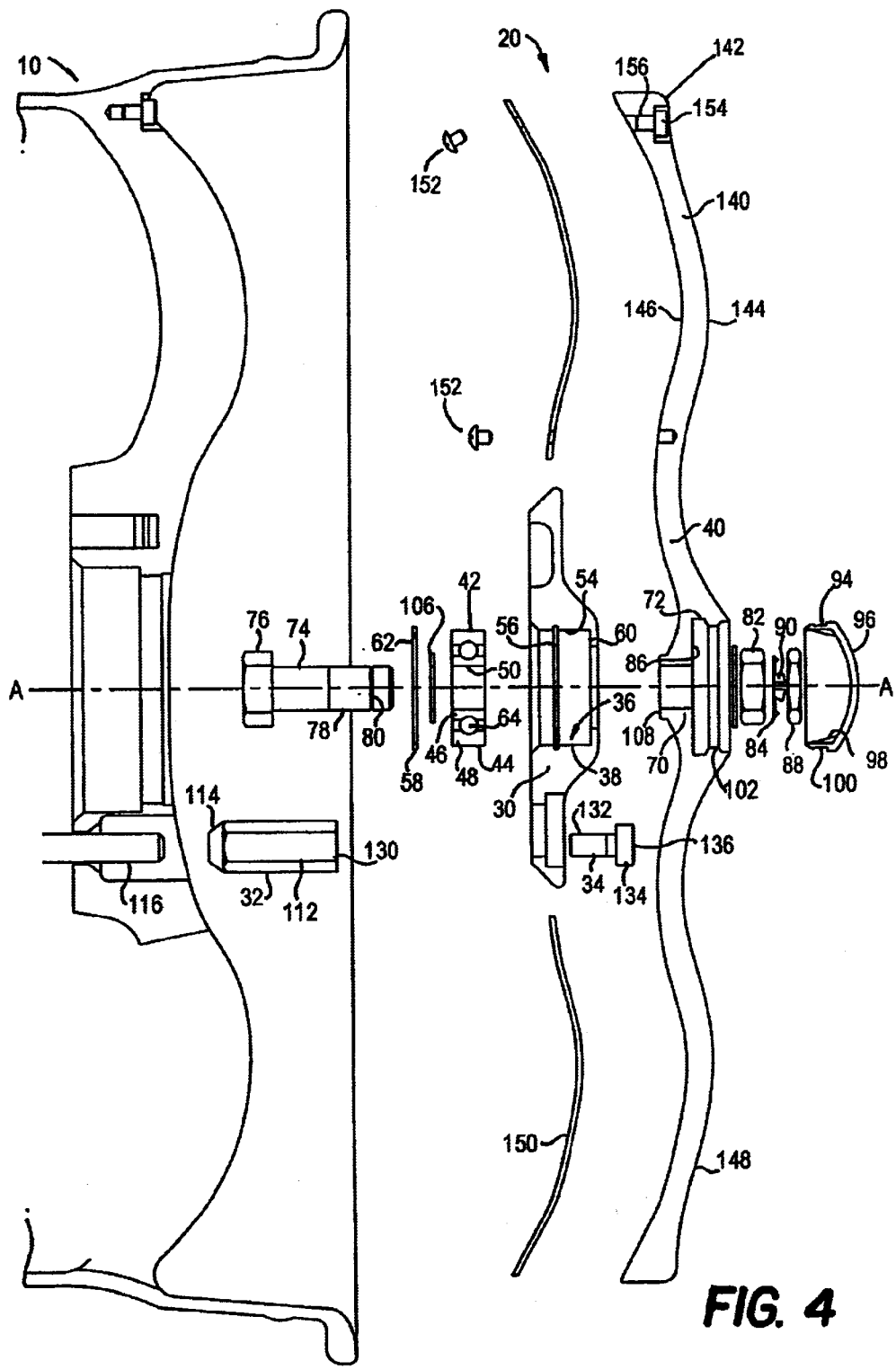
FIG. 4 is an exploded view of the inventive adapter with spinner ornamentation.

FIGS. 1–4 illustrate an automobile wheel 10 having a spinner ornamentation assembly 20 according to the invention installed thereon. The detailed assembly 20 shown in FIGS. 3 and 4 has a central axis A which corresponds to the axis of the wheel when mounted thereon, and includes an adapter 30 which is secured to the wheel 10 by elongated lug nuts 32 and lug nut bolts 34 hereinafter discussed. The adapter 30 has a central aperture 36 aligned with the axis A. A bearing recess 38 in the form of a counter-bore is formed in the rear side of the adapter 30 and is aligned with the aperture 36 as shown.

A decorative spinner 40 has a central axis and is mounted for free rotation on the adapter 30. When assembled, the axis for the spinner 40 and the adapter 30 are aligned with the wheel axis A. When mounted on the wheel 10, the spinner 40 is free to rotate relative thereto. As the wheel 10 rotates, the spinner 40 is carried therewith and rotates as well. When the wheel 10 stops or decelerates the spinner 40 may continue to rotate by inertia.

The spinner 40 is mounted on the adapter 30 by means of a bearing assembly 42 which includes a ball bearing 44 having an inner race 46 and outer race 48 and a central aperture 50. The ball bearing 44 is located in the bearing recess 38. The interior wall 54 of the bearing recess 38 is formed with an annular recess 56, which receives an annular split retaining ring 58. The retaining ring 58 engages the outer race 48 and captures the bearing 44 between the bottom 60 of the bearing recess 38 and the inner margin 62 of the retainer 58. As shown ball bearings 64 are captured between the inner race 46 and outer race 48 and the inner race 46 is free to rotate with respect to the outer race 48 captured in the adapter 30.

The spinner 40 has a central aperture 70. A recess 72 is formed in the front side of the spinner 40. When assembled, the adapter 30, the bearing 42 and the spinner 40 are in alignment as shown. A bolt 74 is located with its head end 76 in the recess 38 in the adapter 30. The threaded end 78 of the bolt 74 extends through the aperture 50 in the bearing 44 and the aperture 70 in the spinner 40. The threaded end 78 of the bolt 74 has an annular recess 80 formed therein as shown. An inner nut 82 is threaded onto the end of the bolt 74; and split washer 84 is located on the bolt 74 in the recess 80 for capturing inner nut 82 on the bolt 74 and in the bottom 86 of the recess 72.

An outer end nut 88 is threaded into the threaded end 78 for bolt 74 to capture the split washer 84 between itself and the inner nut 82. The split washer 84 has deformable radial tabs 90. The end nut 88 is torqued against the inner nut 82 and washer 84. Thereafter the tabs 90 are deformed and folded over to engage the outer surface of the end nut 88 to lock the same in place. A cap 94 having a cover portion 96 and depending sidewalls 98 formed with a detent 100 is snap fit into the recess 72 formed in the spinner 40. The detent 100 engages corresponding surface portions 102 machined in the sidewalls of the recess 72 as shown.

A spacer bushing 106 is located between the head end 76 and the inner race 46 as shown. The back side of the spinner 40 has an annular boss 108 which engages the front side of inner race 46, capturing the same between the head 76 of the bolt 74 and spacer bushing 106, and the spinner 40, such that, when the spinner 40 rotates, the bolt 74, the spacer bushing 106, the inner race 46, and the inner nut 82 and outer nut 88 and the split washer 84 move together in fixed relationship with respect to the adapter 30. In other words the spinner 40 is free to rotate on the adapter 30.

The adapter 30 is secured to the wheel 10 using elongated lug nuts 32, each of which has a standard thread 112 and a tapered end 114 which engages corresponding conventional threaded studs 116 on the wheel. The elongated lug nuts 32 are substituted for selected standard lug nuts on the automobile. As shown in FIGS. 5–6, the adapter 30 has three elongated openings 120 which are positioned at selected circumferential spacing so as to be in alignment with three of the five bolts on a five lug nut pattern wheel, e.g. 144 degrees, 126 degrees and 0 (360) degrees relative to a first one of the openings shown in the drawing. Each opening 120 is formed with a counter-bore 122 to accommodate the head of the lug nut 32. The holes 120 are elongated so that the adapter 30 may be mounted on different wheel configurations for example, wheels having the same five-bolt pattern, but wherein the bolts are located at various radial distances from the center. When mounted on a wheel the adapter 30 self centers with respect to the bolt pattern employed. The adapter 30 has one or more recesses 128 formed in the rear side to reduce the mass of the adapter 30 and to adjust the mass distribution for balancing the adapter 30.

In an alternative embodiment, shown in FIG. 7, an adapter 124 has openings 120 which are equally spaced at 0 (360) degrees, 120 degrees, and 240 degrees relative to a first one of the openings. The openings correspond to three of six holes in a six lug nut pattern wheel.

The elongated lug nuts 32 have a bolt-receiving end 130 which engages the back side of the adapter 30 in alignment with the openings 120 as shown. Each lug nut bolt 34 has an outboard pan head 134 and a threaded portion 132 formed in the inboard end. A lug nut bolt 34 for each lug nut 32 secures the adapter 30 to the wheel. The threaded end 132 engages a corresponding threaded portion 116 of the elongated lug nut 32. The pan head 134 has a keyed slot 136 which receives a corresponding keyed tool to install the device on the wheel. The shape of the keyed slot 136 is nonstandard and is designed to make it more difficult to remove the bolts without authorization.

The spinner 40 is in the form of a circular member having radial spokes 140 and an outer rim 142. The spinner 40 may take the form of a decorative part, which may be formed with a curved front side 144 and a curved inner side 146 as shown. The spinner 40 may also have opened spaces 148 between the spokes 140. An annular disc member 150 may be mounted on the rear side of the spinner 40 as shown. The disc 150 would be generally contoured to follow the corresponding contour of the inner side 146 of the spinner 40. The disc 150 provides for further decorative effect and is secured to the spinner 40 by bolts 152 as shown. Decorative bolts 154 may be provided, and counter bored opening 156 in the outer rim 142 of the spinner 40 as shown. The spinner 40 and adapter 30 are well balanced.

An alternative embodiment of the invention, shown in FIG. 8, employs an adapter 160, having radial arms 162 with openings 164, which arms 162 and openings 164 correspond to the number of bolts in the lug nut pattern as illustrated. The openings may be positioned radially at specific locations corresponding to the specific radial position of the bolts on a particular automotive wheel design. Alternatively, the openings may be elongated as discussed above allowing the adapter to be used on five bolt wheels with differing radial bolt positions.

What is claimed is:

1. A decorative accessory for attachment to an automobile wheel having a selected bolt pattern comprising:
    an adapter having a central aperture and a selected bolt pattern of bolt holes therein matching the corresponding automobile wheel bolt hole pattern;
    a spinner having a central aperture for coaxial alignment with the aperture in the adapter, and being mounted for rotation with respect to the adapter;
    a bearing having a central aperture, for coaxial alignment between the spinner and the adapter, said bearing for supporting the spinner for rotation with respect to the adapter; and
    a fastener engaging the coaxially aligned central apertures for securing the spinner, the bearing and the adapter together, wherein the adapter has a front side and a rear side and a recess formed in the rear side being coaxial with the central aperture for receiving the bearing therein.

2. The accessory according to claim 1, wherein the spinner has a front side and a rear side and a recess formed in the front side being coaxial with the central aperture for receiving the fastener therein.

3. The accessory according to claim 1, wherein the adapter includes a central portion and a plurality of radial apertures disposed at selected circumferential locations corresponding to selected ones of the bolt holes in the corresponding bolt pattern.

4. The accessory according to claim 3, wherein said apertures are radially elongated for accommodating various bolt patterns having varying bolt radial positions.

5. A decorative accessory for attachment to an automobile wheel having a selected bolt pattern comprising:
    an adapter having a central aperture and a selected bolt pattern of bolt holes therein matching the corresponding automobile wheel bolt hole pattern;
    a spinner having a central aperture for coaxial alignment with the aperture in the adapter, and being mounted for rotation with respect to the adapter;
    a bearing having a central aperture, for coaxial alignment between the spinner and the adapter, said bearing for supporting the spinner for rotation with respect to the adapter; and
    a fastener engaging the coaxially aligned central apertures for securing the spinner, the bearing and the adapter together wherein the bearing has inner and outer portions rotatable with respect to each other, and wherein the inner portion is secured to the spinner and the outer portion is secured to the adapter.

6. The accessory according to claim 1 wherein the bearing comprises a ball bearing having an inner and outer race and the spinner has a boss for engaging the inner race.

7. The accessory according to claim 5, further including a fastener for securing the inner portion of the bearing with respect to the adapter.

8. The accessory according to claim 7, wherein the adapter is formed with a recess having a sidewall coaxial with the central opening, and the sidewall has a radial annular slot, for receiving the fastener.

9. The accessory according to claim 7, wherein the fastener comprises a bolt disposed in the central opening for securing the spinner to the adapter.

10. The accessory according to claim 9, wherein the bolt has a threaded end and a nut disposed on the bolt.

11. The accessory according to claim 9, wherein a locking washer is disposed on the threaded end of the bolt and an outer fastener is located adjacent the washer for engaging the nut.

12. The accessory according to claim 11, wherein the washer has radial tabs for engaging at least one of the fastener and nut.

13. The accessory according to claim 8, wherein the fastener comprises a split ring.

14. The accessory according to claim 1 wherein the spinner comprises a body having radial spokes having radial spaces between the spokes.

15. A decorative accessory for attachment to an automobile wheel having a selected bolt pattern comprising:

an adapter having a central aperture and a selected bolt pattern of bolt holes therein matching the corresponding automobile wheel bolt hole pattern;

a spinner having a central aperture for coaxial alignment with the aperture in the adapter, and being mounted for rotation with respect to the adapter;

a bearing having a central aperture, for coaxial alignment between the spinner and the adapter, said bearing for supporting the spinner for rotation with respect to the adapter; and a fastener engaging the coaxially aligned central apertures for securing the spinner, the bearing and the adapter together wherein the spinner comprises a body having radial spokes having radial spaces between the spokes and further comprises a transparent shield for bridging the spaces between the spokes.

* * * * *